US012438822B2

(12) United States Patent
Cavalcanti et al.

(10) Patent No.: US 12,438,822 B2
(45) Date of Patent: Oct. 7, 2025

(54) APPARATUS, SYSTEM, AND METHOD OF OUT-OF-ORDER DELIVERY OF WIRELESS COMMUNICATION FRAMES

(71) Applicant: Intel Corporation, Santa Clara, CA (US)

(72) Inventors: Dave Cavalcanti, Portland, OR (US); Dibakar Das, Hillsboro, OR (US); Laurent Cariou, Milizac (FR); Dmitry Akhmetov, Hillsboro, OR (US); Ganesh Venkatesan, Hillsboro, OR (US); Juan Fang, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 776 days.

(21) Appl. No.: 17/561,511

(22) Filed: Dec. 23, 2021

(65) Prior Publication Data
US 2022/0116333 A1    Apr. 14, 2022

(51) Int. Cl.
*H04L 47/34* (2022.01)
*H04L 69/324* (2022.01)
*H04W 28/14* (2009.01)

(52) U.S. Cl.
CPC ............ *H04L 47/34* (2013.01); *H04L 69/324* (2013.01); *H04W 28/14* (2013.01)

(58) Field of Classification Search
None
See application file for complete search history.

(56) References Cited

U.S. PATENT DOCUMENTS

| | | | | |
|---|---|---|---|---|
| 2001/0042131 A1* | 11/2001 | Mathon | ............... | H04L 69/14 709/238 |
| 2010/0118876 A1* | 5/2010 | Meyer | ............... | H04L 1/1851 370/394 |
| 2011/0051669 A1* | 3/2011 | Wang | ............... | H04L 1/1829 370/328 |
| 2014/0254349 A1* | 9/2014 | Jia | ............... | H04W 28/0252 370/216 |

(Continued)

FOREIGN PATENT DOCUMENTS

WO    2018/059447    4/2018

OTHER PUBLICATIONS

IEEE Standard for Information Technology—Telecommunications and Information Exchange between Systems Local and Metropolitan Area Networks—Specific Requirements, Part 11: Wireless LAN Medium Access Control (MAC) and Physical Layer (PHY) Specifications, IEEE Computer Society, IEEE Std 802.11™-2020 (Revision of IEEE Std 802.11-2016), Approved Dec. 3, 2020, 4379 pages.

(Continued)

*Primary Examiner* — Otis L Thompson, Jr.
(74) *Attorney, Agent, or Firm* — Shichrur & Co.

(57) ABSTRACT

For example, a wireless communication station (STA) may be configured to determine whether a stream of frames is suitable for out-of-order delivery from a first Medium Access Control layer (MAC-layer) process to a second MAC-layer process, the second MAC-layer process is above the first MAC-layer process; and, based on a determination that the stream of frames is suitable for out-of-order delivery, to deliver to the second MAC-layer process one or more frames of the stream of frames according to an out-of-order delivery scheme.

24 Claims, 8 Drawing Sheets

(56) References Cited

U.S. PATENT DOCUMENTS

2017/0171060 A1\* 6/2017 Liu ........................ H04L 67/60
2020/0037288 A1   1/2020 Huang et al.
2021/0084533 A1\* 3/2021 Huang .................. H04L 45/245
2021/0160958 A1\* 5/2021 Patil ..................... H04L 1/1835

OTHER PUBLICATIONS

Search Report for European Patent Application No. 22201634.7, mailed on May 12, 2023, 9 pages.
Office Action for European Patent Application No. 22201634.7, mailed on May 24, 2024, 9 pages.
Office Action for European Patent Application No. 22201634.7, mailed on Jan. 27, 2025, 4 pages.

\* cited by examiner

APPARATUS, SYSTEM, AND METHOD OF OUT-OF-ORDER DELIVERY OF WIRELESS COMMUNICATION FRAMES

TECHNICAL FIELD

Aspects described herein generally relate to out-of-order delivery of wireless communication frames.

BACKGROUND

Devices in a wireless communication system may be configured to communicate according to communication protocols, which may be designed for in-order delivery of packets to higher layers. For example, such communication protocols may utilize mechanisms, e.g., packet aggregation, reordering, and/or Medium Access Control (MAC) protection mechanisms, which may be designed for in-order delivery. For example, a frame with a higher MAC Sequence Number (SN) may not be forwarded up by a recipient wireless communication station (STA) if there is a frame with a lower SN has not yet been received.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
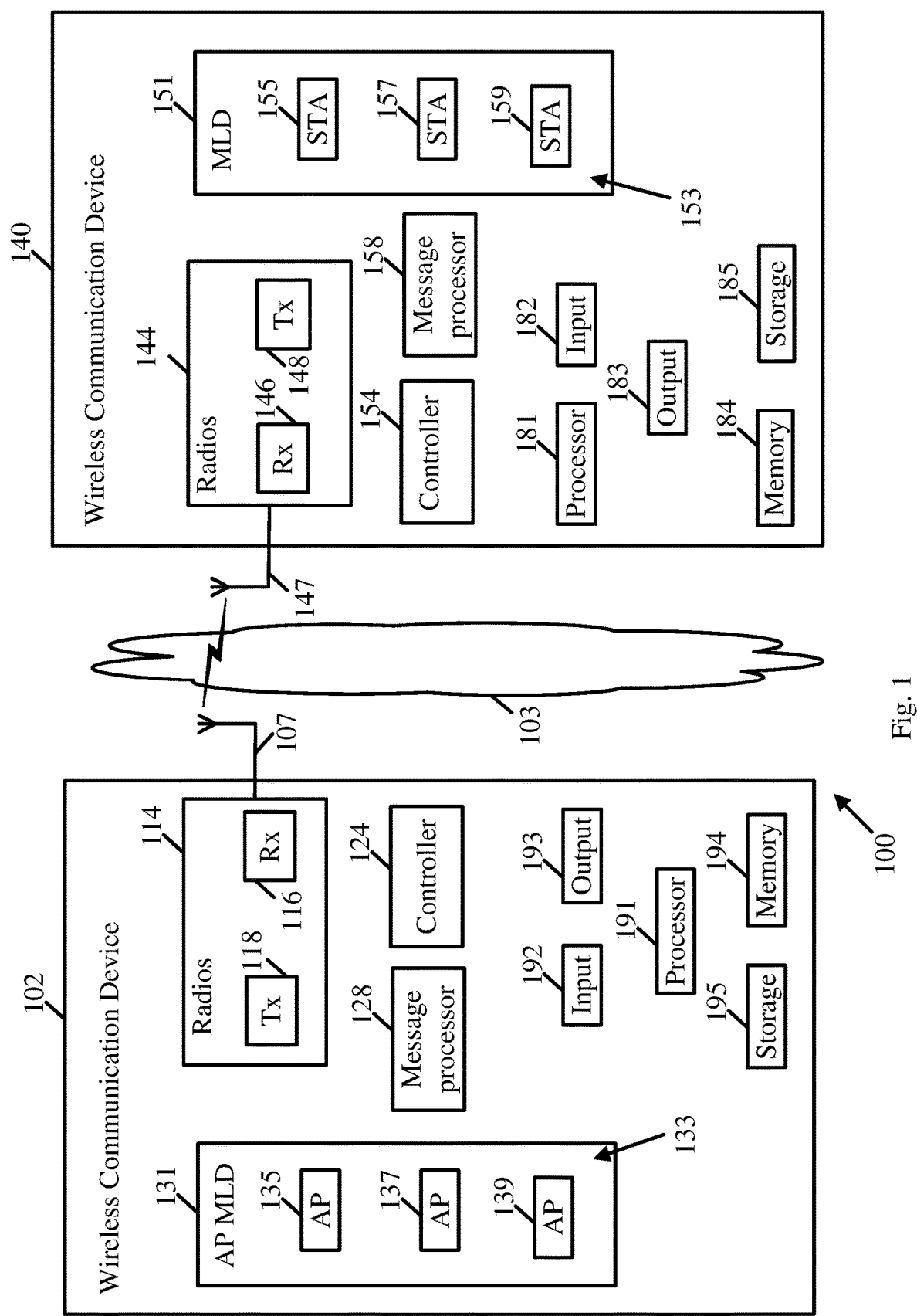
FIG. 1 is a schematic block diagram illustration of a system, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one aspect", "an aspect", "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some aspects may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some aspects may be used in conjunction with devices and/or networks operating in accordance with existing IEEE 802.11 standards (including IEEE 802.11-2020 (*IEEE 802.11-2020, IEEE Standard for Information Technology—Telecommunications and Information Exchange between Systems Local and Metropolitan Area Networks—Specific Requirements; Part 11: Wireless LAN Medium Access Control (MAC) and Physical Layer (PHY) Specifications, December,* 2020); and/or IEEE 802.11be (IEEE *P802.11be/ D1.2 Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 8: Enhancements for extremely high throughput*

(*EHT*), *September* 2021)) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some aspects may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some aspects may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other aspects may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative aspects, a wireless device may be or may include a peripheral that may be integrated with a computer, or a peripheral that may be attached to a computer. In some demonstrative aspects, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated or group), and/or memory (shared. Dedicated, or group), that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative aspects may be used in conjunction with a WLAN, e.g., a WiFi network. Other aspects may be used in conjunction with any other suitable wireless communication network, for example, a wireless area network, a "piconet", a WPAN, a WVAN and the like.

Some demonstrative aspects may be used in conjunction with a wireless communication network communicating over a sub-10 Gigahertz (GHz) frequency band, for example, a 2.4 GHz frequency band, a 5 GHz frequency band, a 6 GHz frequency band, and/or any other frequency below 10 GHz. However, other aspects may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHz, a frequency band above 45 GHz, a 5G frequency band, a frequency band below 20 GHz, a Sub 1 GHz (S1G) band, a WLAN frequency band, a WPAN frequency band, and the like.

The term "antenna", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like.

Reference is made to FIG. 1, which schematically illustrates a system 100, in accordance with some demonstrative aspects.

As shown in FIG. 1, in some demonstrative aspects, system 100 may include one or more wireless communication devices. For example, system 100 may include a wireless communication device 102, a wireless communication device 140, and/or one or more other devices.

In some demonstrative aspects, devices 102 and/or 140 may include a mobile device or a non-mobile, e.g., a static, device.

For example, devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative aspects, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative aspects, some or all of the components of one or more of devices 102 and/or 140 may be enclosed in a common housing or packaging, and may be interconnected or operably associated using one or more wired or wireless links. In other aspects, components of one or more of devices 102 and/or 140 may be distributed among multiple or separate devices.

In some demonstrative aspects, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 191 may execute instructions, for example, of an Operating System (OS) of device 102 and/or of one or more suitable applications. Processor 181 may execute instructions, for example, of an Operating System (OS) of device 140 and/or of one or more suitable applications.

In some demonstrative aspects, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative aspects, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative aspects, wireless communication devices 102 and/or 140 may be capable of communicating content, data, information and/or signals via a wireless medium (WM) 103. In some demonstrative aspects, wireless medium 103 may include, for example, a radio channel, an RF channel, a WiFi channel, a cellular channel, a 5G channel, an IR channel, a Bluetooth (BT) channel, a Global Navigation Satellite System (GNSS) Channel, and the like.

In some demonstrative aspects, WM 103 may include one or more wireless communication frequency bands and/or channels. For example, WM 103 may include one or more channels in a sub-10 Ghz wireless communication frequency band, for example, a 2.4 GHz wireless communication frequency band, one or more channels in a 5 GHz wireless communication frequency band, and/or one or more channels in a 6 GHz wireless communication frequency band. In another example, WM 103 may additionally or alternative include one or more channels in a mmWave wireless communication frequency band.

In other aspects, WM 103 may include any other type of channel over any other frequency band.

In some demonstrative aspects, device 102 and/or device 140 may include one or more radios including circuitry and/or logic to perform wireless communication between devices 102, 140 and/or one or more other wireless communication devices. For example, device 102 may include one or more radios 114, and/or device 140 may include one or more radios 144.

In some demonstrative aspects, radios 114 and/or 144 may include one or more wireless receivers (Rx) including circuitry and/or logic to receive wireless communication signals, RF signals, frames, blocks, transmission streams, packets, messages, data items, and/or data. For example, a radio 114 may include at least one receiver 116, and/or a radio 144 may include at least one receiver 146.

In some demonstrative aspects, radios 114 and/or 144 may include one or more wireless transmitters (Tx) including circuitry and/or logic to transmit wireless communication signals, RF signals, frames, blocks, transmission streams, packets, messages, data items, and/or data. For example, a radio 114 may include at least one transmitter 118, and/or a radio 144 may include at least one transmitter 148.

In some demonstrative aspects, radios 114 and/or 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radios 114 and/or 144 may include or may be implemented as part of a wireless Network Interface Card (NIC), and the like.

In some demonstrative aspects, radios 114 and/or 144 may be configured to communicate over a 2.4 GHz band, a 5 GHz band, a 6 GHz band, and/or any other band, for example, a directional band, e.g., an mmWave band, a 5G band, an S1G band, and/or any other band.

In some demonstrative aspects, radios 114 and/or 144 may include, or may be associated with one or more, e.g., a plurality of, antennas.

In some demonstrative aspects, device 102 may include one or more, e.g., a plurality of, antennas 107, and/or device 140 may include on or more, e.g., a plurality of, antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. In some aspects, antennas 107 and/or 147 may implement transmit and receive functionalities using separate transmit and receive antenna elements. In some aspects, antennas 107 and/or 147 may implement transmit and receive functionalities using common and/or integrated transmit/receive elements.

In some demonstrative aspects, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140 and/or one or more other devices, e.g., as described below.

In some demonstrative aspects, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein. In one example, controller 154 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative aspects, at least part of the functionality of controller 124 may be implemented as part of one or more elements of radio 114, and/or at least part of the functionality of controller 154 may be implemented as part of one or more elements of radio 144.

In other aspects, the functionality of controller 124 may be implemented as part of any other element of device 102, and/or the functionality of controller 154 may be implemented as part of any other element of device 140.

In some demonstrative aspects, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 128 may be configured to perform any other additional or alternative functionality and/or may include any other additional or alternative components to generate and/or process a message to be transmitted.

In some demonstrative aspects, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In one example, message processor 158 may include at least one first component configured to generate a message, for example, in the form of a frame, field, information element and/or protocol data unit, for example, an MPDU; at least one second component configured to convert the message into a PPDU, for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 158 may be configured to perform any other additional or alternative functionality and/or may include any other additional or alternative components to generate and/or process a message to be transmitted.

In some demonstrative aspects, message processors 128 and/or 158 may include, or may be implemented, partially or entirely, by circuitry and/or logic, e.g., one or more processors including circuitry and/or logic, memory circuitry and/or logic, MAC circuitry and/or logic, PHY circuitry and/or logic, BB circuitry and/or logic, a BB processor, a BB memory, AP circuitry and/or logic, an AP processor, an AP memory, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative aspects, at least part of the functionality of message processor 128 may be implemented as part of radio 114, and/or at least part of the functionality of message processor 158 may be implemented as part of radio 144.

In some demonstrative aspects, at least part of the functionality of message processor 128 may be implemented as part of controller 124, and/or at least part of the functionality of message processor 158 may be implemented as part of controller 154.

In other aspects, the functionality of message processor 128 may be implemented as part of any other element of device 102, and/or the functionality of message processor 158 may be implemented as part of any other element of device 140.

In some demonstrative aspects, at least part of the functionality of controller 124 and/or message processor 128 may be implemented by an integrated circuit, for example, a chip, e.g., a System on Chip (SoC). In one example, the chip or SoC may be configured to perform one or more functionalities of one or more radios 114. For example, the chip or SoC may include one or more elements of controller 124, one or more elements of message processor 128, and/or one or more elements of one or more radios 114. In one example, controller 124, message processor 128, and one or more radios 114 may be implemented as part of the chip or SoC.

In other aspects, controller 124, message processor 128 and/or the one or more radios 114 may be implemented by one or more additional or alternative elements of device 102.

In some demonstrative aspects, at least part of the functionality of controller 154 and/or message processor 158 may be implemented by an integrated circuit, for example, a chip, e.g., a SoC. In one example, the chip or SoC may be configured to perform one or more functionalities of one or more radios 144. For example, the chip or SoC may include one or more elements of controller 154, one or more elements of message processor 158, and/or one or more elements of one or more radios 144. In one example, controller 154, message processor 158, and one or more radios 144 may be implemented as part of the chip or SoC.

In other aspects, controller 154, message processor 158 and/or one or more radios 144 may be implemented by one or more additional or alternative elements of device 140.

In some demonstrative aspects, device 102 and/or device 140 may include, operate as, perform the role of, and/or perform one or more functionalities of, one or more STAs. For example, device 102 may include at least one STA, and/or device 140 may include at least one STA.

In some demonstrative aspects, device 102 and/or device 140 may include, operate as, perform the role of, and/or perform one or more functionalities of, one or more Extremely High Throughput (EHT) STAs. For example, device 102 may include, operate as, perform the role of, and/or perform one or more functionalities of, one or more EHT STAs, and/or device 140 may include, operate as, perform the role of, and/or perform one or more functionalities of, one or more EHT STAs.

In other aspects, devices 102 and/or 140 may include, operate as, perform the role of, and/or perform one or more functionalities of, any other wireless device and/or station, e.g., a WLAN STA, a WiFi STA, and the like.

In some demonstrative aspects, device 102 and/or device 140 may be configured operate as, perform the role of, and/or perform one or more functionalities of, an access point (AP), e.g., an EHT AP STA.

In some demonstrative aspects, device 102 and/or device 140 may be configured to operate as, perform the role of, and/or perform one or more functionalities of, a non-AP STA, e.g., an EHT non-AP STA.

In other aspects, device 102 and/or device 140 may operate as, perform the role of, and/or perform one or more functionalities of, any other additional or alternative device and/or station.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains one station (STA) and provides access to the distribution services, via the wireless medium (WM) for associated STAs. An AP may include a STA and a distribution system access function (DSAF). The AP may perform any other additional or alternative functionality.

In some demonstrative aspects devices 102 and/or 140 may be configured to communicate in an EHT network, and/or any other network.

In some demonstrative aspects, devices 102 and/or 140 may be configured to operate in accordance with one or more Specifications, for example, including one or more *IEEE* 802.11 *Specifications*, e.g., an *IEEE* 802.11-2020 *Specification, an IEEE* 802.11*be Specification*, and/or any other specification and/or protocol.

In some demonstrative aspects, device 102 and/or device 140 may include, operate as, perform a role of, and/or perform the functionality of, one or more multi-link logical entities, e.g., as described below.

In other aspect, device 102 and/or device 140 may include, operate as, perform a role of, and/or perform the functionality of, any other entities, e.g., which are not multi-link logical entities.

For example, a multi-link logical entity may include a logical entity that contains one or more STAs. The logical entity may have one MAC data service interface and primitives to the logical link control (LLC) and a single address associated with the interface, which can be used to communicate on a distribution system medium (DSM). For example, the DSM may include a medium or set of media used by a distribution system (DS) for communications between APs, mesh gates, and the portal of an extended service set (ESS). For example, the DS may include a system used to interconnect a set of basic service sets (BSSs) and integrated local area networks (LANs) to create an extended service set (ESS). In one example, a multi-link logical entity may allow STAs within the multi-link logical entity to have the same MAC address. The multi-link entity may perform any other additional or alternative functionality.

In some demonstrative aspects, device 102 and/or device 140 may include, operate as, perform a role of, and/or perform the functionality of, a Multi-Link Device (MLD). For example, device 102 may include, operate as, perform a role of, and/or perform the functionality of, at least one MLD, and/or device 140 may include, operate as, perform a role of, and/or perform the functionality of, at least one MLD, e.g., as described below.

For example, an MLD may include a device that is a logical entity and has more than one affiliated STA and has a single MAC service access point (SAP) to LLC, which includes one MAC data service. The MLD may perform any other additional or alternative functionality.

In some demonstrative aspects, for example, an infrastructure framework may include a multi-link AP logical entity, which includes APs, e.g., on one side, and a multi-link non-AP logical entity, which includes non-APs, e.g., on the other side.

In some demonstrative aspects, device 102 and/or device 140 may be configured operate as, perform the role of, and/or perform one or more functionalities of, an AP MLD.

In some demonstrative aspects, device 102 and/or device 140 may be configured to operate as, perform the role of, and/or perform one or more functionalities of, a non-AP MLD.

In other aspects, device 102 and/or device 140 may operate as, perform the role of, and/or perform one or more functionalities of, any other additional or alternative device and/or station.

For example, an AP MLD may include an MLD, where each STA affiliated with the MLD is an AP. In one example, the AP MLD may include a multi-link logical entity, where each STA within the multi-link logical entity is an EHT AP. The AP MLD may perform any other additional or alternative functionality.

For example, a non-AP MLD may include an MLD, where each STA affiliated with the MLD is a non-AP STA. In one example, the non-AP MLD may include a multi-link logical entity, where each STA within the multi-link logical entity is a non-AP EHT STA. The non-AP MLD may perform any other additional or alternative functionality.

In one example, a multi-link infrastructure framework may be configured as an extension from a one link operation between two STAs, e.g., an AP and a non-AP STA.

In some demonstrative aspects, controller 124 may be configured to control, perform and/or to trigger, cause, instruct and/or control device 102 to operate as, perform a role of, and/or perform one or more operations and/or functionalities of, an AP MLD 131 including a plurality of AP STAs 133, e.g., including an AP STA 135, an AP STA 137 and/or an AP STA 139. In some aspects, as shown in FIG. 1, AP MLD 131 may include three AP STAs. In other aspects, AP MLD 131 may include any other number of AP STAs.

In one example, AP STA 135, AP STA 137 and/or AP STA 139 may operate as, perform a role of, and/or perform one or more operations and/or functionalities of, an EHT AP STA. In other aspects, AP STA 135, AP STA 137 and/or AP STA 139 may perform any other additional or alternative functionality.

In some demonstrative aspects, for example, the one or more radios 114 may include, for example, a radio for communication by AP STA 135 over a first wireless communication frequency channel and/or frequency band, e.g., a 2.4 Ghz band, as described below.

In some demonstrative aspects, for example, the one or more radios 114 may include, for example, a radio for communication by AP STA 137 over a second wireless communication frequency channel and/or frequency band, e.g., a 5 Ghz band, as described below.

In some demonstrative aspects, for example, the one or more radios 114 may include, for example, a radio for communication by AP STA 139 over a third wireless communication frequency channel and/or frequency band, e.g., a 6 Ghz band, as described below.

In some demonstrative aspects, the radios 114 utilized by APs 133 may be implemented as separate radios. In other aspects, the radios 114 utilized by APs 133 may be implemented by one or more shared and/or common radios and/or radio components.

In other aspects controller 124 may be configured to control, perform and/or to trigger, cause, instruct and/or control device 102 to operate as, perform a role of, and/or perform one or more operations and/or functionalities of, any other additional or alternative entity and/or STA, e.g., a single STA, multiple STAs, and/or a non-MLD entity.

In some demonstrative aspects, controller 154 may be configured to control, perform and/or to trigger, cause, instruct and/or control device 140 to operate as, perform a role of, and/or perform one or more operations and/or functionalities of, an MLD 151 including a plurality of STAs 153, e.g., including a STA 155, a STA 157 and/or a STA 159. In some aspects, as shown in FIG. 1, MLD 151 may include three STAs. In other aspects, MLD 151 may include any other number of STAs.

In one example, STA 155, STA 157 and/or STA 159 may operate as, perform a role of, and/or perform one or more operations and/or functionalities of, an EHT STA. In other aspects, STA 155, STA 157 and/or STA 159 may perform any other additional or alternative functionality.

In some demonstrative aspects, for example, the one or more radios 144 may include, for example, a radio for communication by STA 155 over a first wireless communication frequency channel and/or frequency band, e.g., a 2.4 Ghz band, as described below.

In some demonstrative aspects, for example, the one or more radios 144 may include, for example, a radio for communication by STA 157 over a second wireless communication frequency channel and/or frequency band, e.g., a 5 Ghz band, as described below.

In some demonstrative aspects, for example, the one or more radios 144 may include, for example, a radio for communication by STA 159 over a third wireless communication frequency channel and/or frequency band, e.g., a 6 Ghz band, as described below.

In some demonstrative aspects, the radios 144 utilized by STAs 153 may be implemented as separate radios. In other aspects, the radios 144 utilized by STAs 153 may be implemented by one or more shared and/or common radios and/or radio components.

In some demonstrative aspects, controller 154 may be configured to control, perform and/or to trigger, cause, instruct and/or control MLD 151 to operate as, perform a role of, and/or perform one or more operations and/or functionalities of, a non-AP MLD. For example, STA 155, STA 157 and/or STA 159 may operate as, perform a role of, and/or perform one or more operations and/or functionalities of, a non-AP EHT STA.

In some demonstrative aspects, controller 154 may be configured to control, perform and/or to trigger, cause, instruct and/or control MLD 151 to operate as, perform a role of, and/or perform one or more operations and/or functionalities of, an AP MLD. For example, STA 155, STA 157 and/or STA 159 may operate as, perform a role of, and/or perform one or more operations and/or functionalities of, an AP EHT STA.

In other aspects controller 154 may be configured to control, perform and/or to trigger, cause, instruct and/or control device 140 to operate as, perform a role of, and/or perform one or more operations and/or functionalities of, any other additional or alternative entity and/or STA, e.g., a single STA, multiple STAs, and/or a non-MLD entity.

Figure 2:
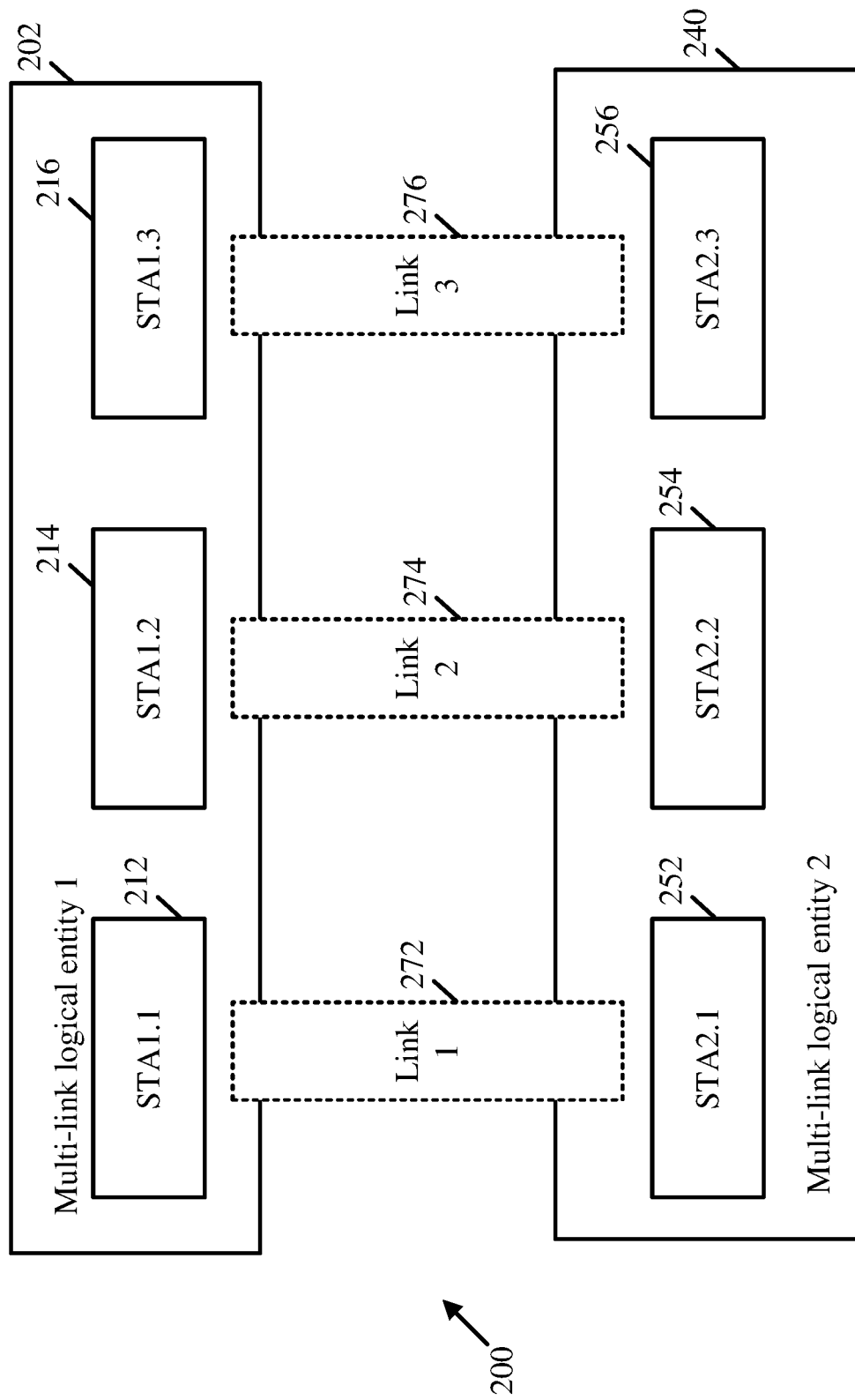
FIG. 2 is a schematic illustration of a multi-link communication scheme, which may be implemented in accordance with some demonstrative aspects.

Reference is made to FIG. 2, which schematically illustrates a multi-link communication scheme 200, which may be implemented in accordance with some demonstrative aspects.

As shown in FIG. 2, a first multi-link logical entity 202 ("multi-link logical entity 1"), e.g., a first MLD, may include a plurality of STAs, e.g., including a STA 212, a STA 214, and a STA 216. In one example, AP MLD 131 (FIG. 1) may perform one or more operations, one or more functionalities, the role of, and/or the functionality of, multi-link logical entity 202.

As shown in FIG. 2, a second multi-link logical entity 240 ("multi-link logical entity 2"), e.g., a second MLD, may include a plurality of STAs, e.g., including a STA 252, a STA 254, and a STA 256. In one example, MLD 151 (FIG. 1) may perform one or more operations, one or more functionalities, the role of, and/or the functionality of, multi-link logical entity 240.

As shown in FIG. 2, multi-link logical entity 202 and multi-link logical entity 240 may be configured to form, setup and/or communicate over a plurality of links, for example, including a link 272 between STA 212 and STA 252, a link 274 between STA 214 and STA 254, and/or a link 276 between STA 216 and STA 256.

Figure 3:
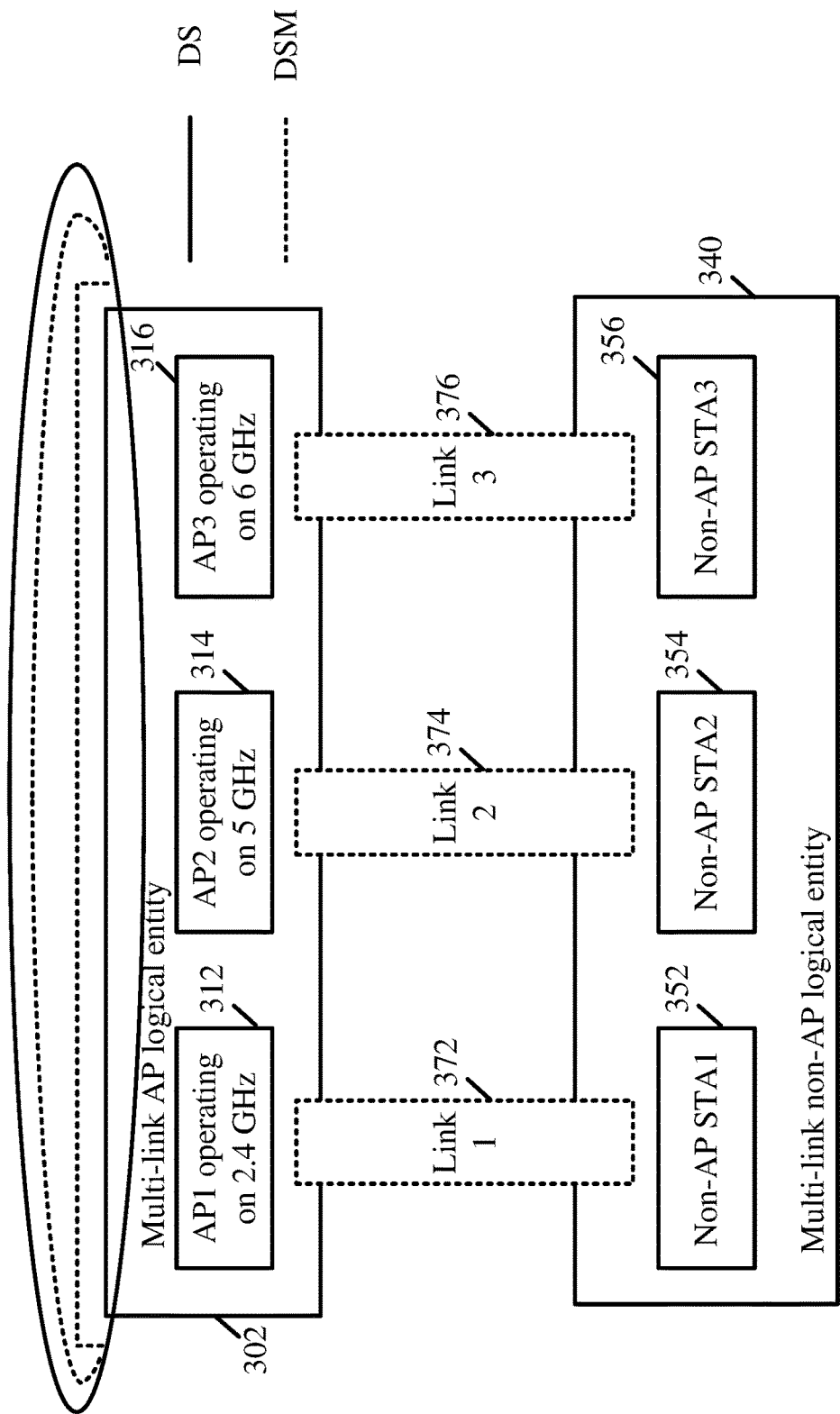
FIG. 3 is a schematic illustration of a multi-link communication scheme, which may be implemented in accordance with some demonstrative aspects.

Reference is made to FIG. 3, which schematically illustrates a multi-link communication scheme 300, which may be implemented in accordance with some demonstrative aspects.

As shown in FIG. 3, a multi-link AP logical entity 302, e.g., an AP MLD, may include a plurality of AP STAs, e.g., including an AP STA 312, an AP STA 314, and an AP STA 316. In one example, AP MLD 131 (FIG. 1) may perform one or more operations, one or more functionalities, the role of, and/or the functionality of, multi-link AP logical entity 302.

As shown in FIG. 3, a multi-link non-AP logical entity 340, e.g., a non-AP MLD, may include a plurality of non-AP STAs, e.g., including a non-AP STA 352, a non-AP STA 354, and a non-AP STA 356. In one example, MLD 151 (FIG. 1) may perform one or more operations, one or more functionalities, the role of, and/or the functionality of, multi-link non-AP logical entity 340.

As shown in FIG. 3, multi-link AP logical entity 302 and multi-link non-A logical entity 340 may be configured to form, setup and/or communicate over a plurality of links, for example, including a link 372 between AP STA 312 and non-AP STA 352, a link 374 between AP STA 314 and non-AP STA 354, and/or a link 376 between AP STA 316 and non-AP STA 356.

For example, as shown in FIG. 3, multi-link AP logical entity 302 may include a multi-band AP MLD, which may be configured to communicate over a plurality of wireless communication frequency bands. For example, as shown in FIG. 3, AP STA 312 may be configured to communicate over a 2.4 Ghz frequency band, AP STA 314 may be configured to communicate over a 5 Ghz frequency band, and/or AP STA 316 may be configured to communicate over a 6 Ghz frequency band. In other aspects, AP STA 312, AP STA 314, and/or AP STA 216, may be configured to communicate over any other additional or alternative wireless communication frequency bands.

Referring back to FIG. 1, in some demonstrative aspects, devices 102 and/or 140 may be configured to support out-of-order delivery of wireless communication frames, e.g., as described below.

In some demonstrative aspects, devices 102 and/or 140 may be configured to support a technical solution to address a technical problem of Head-of Line (HOL) blocking at a Medium Access Control (MAC) layer, e.g., as described below.

In some demonstrative aspects, in some use cases, implementations and/or scenarios, there may be a need to address one or more technical disadvantages of an in-order delivery scheme, e.g., as described below.

For example, wireless communication protocols configured according to an in-order delivery scheme may lead to HOL blocking, for example, when a packet with a larger Serial number (SN) may be held back at a recipient STA, for example, until a packet with a lower SN is delivered. This HOL blocking situation may not be desirable in some use cases, scenarios and/or implementations.

In one example, blocked packets and blocking packets in the HOL blocking situation may belong to different higher/transport layer streams, for example, User Datagram Protocol (UDP) streams, e.g., including streams generated via a QUIC transport layer mechanism, which may happen to map to a same Traffic Identifier (TID). For example, in case of a limited number of TIDs, e.g., 8 TIDs, it may be likely that devices supporting multiple traffic streams may have to map different streams to the same TID.

In another example, blocked packets and blocking packets in the HOL blocking situation may belong to different Transmission Control Protocol (TCP) streams. This situation may already ensure in-order delivery.

In another example, an application layer may have its own mechanism to ensure in-order delivery.

In another example, time-sensitive applications may generate deterministic traffic flows of typically small packets with a given periodicity and deadline. In such an implementation, packets received out of order may not be useful and therefore may be dropped.

In another example, some applications, for example, real-time applications, e.g., live-streaming applications, may be able to tolerate some packet drops in order to get lower latency for the latest packets.

In another example, streams may belong to a single TCP stream, while a TCP congestion control mechanism may have some level of tolerance built into it for out-of-order packet delivery, e.g., according to a RACK webserver interface protocol.

In another example, the QUIC protocol may be configured to address the HOL blocking issue in a transport layer, for example, by dividing flows that belong to a same UDP connection into separate streams. For example, frames belonging to a same stream may be independently processed in-order, e.g., even if an older frame that belongs to a different stream has not been received yet. However, if HOL blocking happens at a lower layer it may reduce the efficiency of the QUIC protocol.

Figure 4:
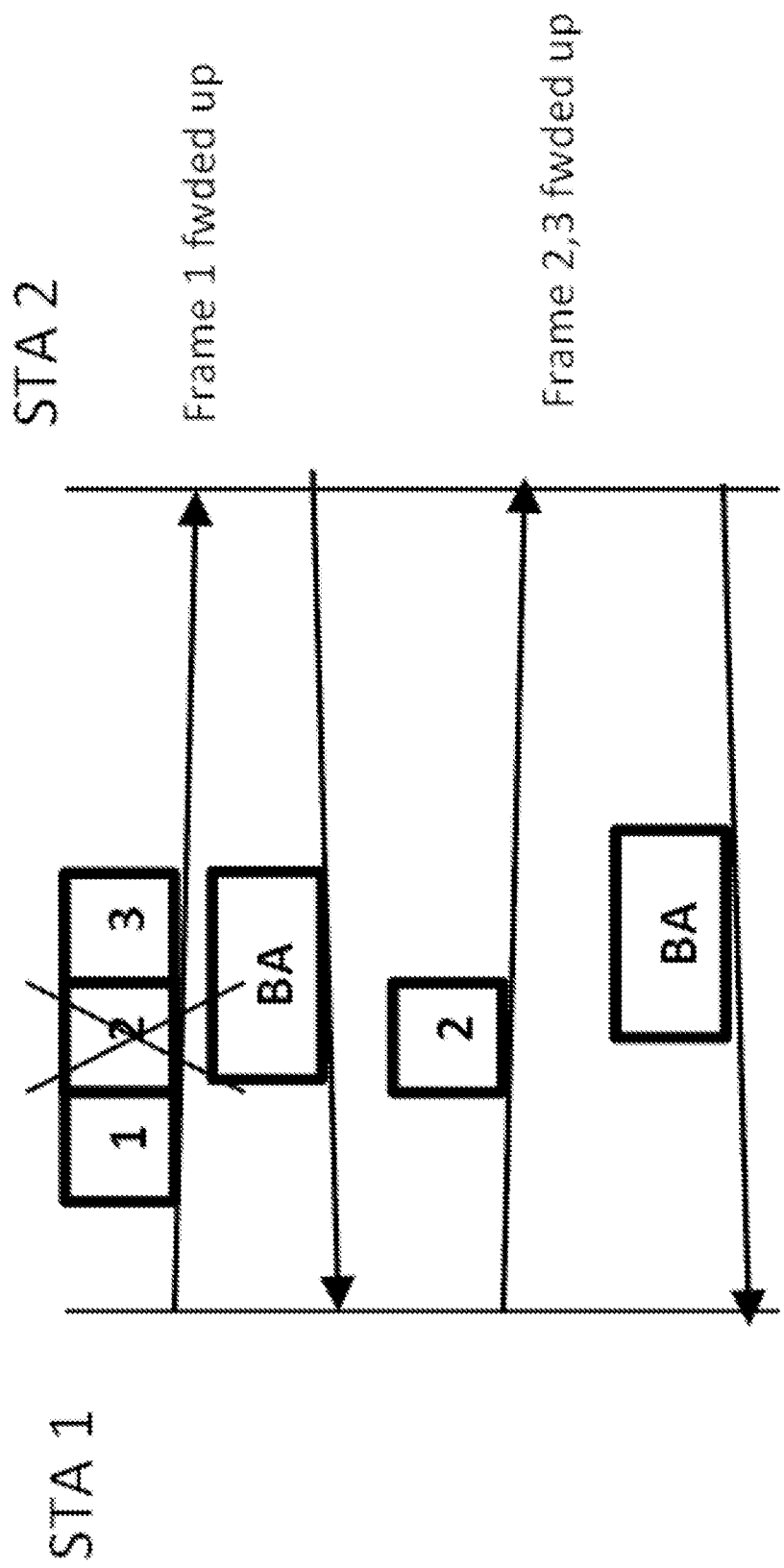
FIG. 4 is a schematic illustration of communications according to an in-order delivery scheme to illustrate a technical problem, which may be addressed in accordance with some demonstrative aspects.

Reference is made to FIG. 4, which schematically illustrates communications according to an in-order delivery scheme to illustrate a technical problem, which may be addressed in accordance with some demonstrative aspects.

As shown in FIG. 4, a first STA, denoted STA 1, may transmit to a second STA, denoted STA 2, a stream of frames, e.g., including three frames, denoted as frame 1, frame 2, and frame 3.

As shown in FIG. 4, the frame 1 and the frame 3 may be successfully received by the STA 2, while the frame 2 may not be received.

As shown in FIG. 4, the STA 2 may be configured to process received frames according to an in-order delivery scheme. For example, the STA 2 may deliver the frame 1 to an upper processing layer, while the frame 3 may be "blocked". For example, although the frame 3 has been properly received by the STA 2, the frame 3 may not be delivered to the upper processing layer, e.g., since the frame 2 has not yet been received correctly.

As shown in FIG. 4, the blocking of frame 3 may result in the STA 2 waiting until the frame 2 is successfully received from the STA 1, before the STA 2 can deliver the frame 3 to the upper processing layer.

For example, as shown in FIG. 4, the STA 2 may transmit to the STA 1 a Block Acknowledgement (BA) indicating the successful receipt of the frame 1 and the frame 3. For example, the STA 2 may successfully receive a retransmission of the frame 2 from the STA 1, and the STA 2 may then forward the frame 2 and the frame 3 to the upper processing layer.

In some use cases, scenarios and/or implementations, one possible solution to address the problem of HOL blocking may involve increasing a number of TIDs supported in practice, e.g., from 8 to 15, or any other larger number. However, increasing the number of TIDs may lead to a simultaneous increase in hardware memory, which may be required for some implementations that maintain separate TID queues in a lower MAC. In addition, the solution based on increasing of the number of TIDs may not be scalable with the number of applications.

In some use cases, scenarios and/or implementations, one possible solution to address the problem of HOL blocking may involve implementing deep packet inspection at the sender side to classify flows, which may be mapped to same TID, for example, based on upper layer parameters, e.g., protocol, IP header, Port number, or the like. For example, intelligent transmission grouping may be performed based on the deep packet inspection. For example, such intelligent scheduling of packets based on the type of flow can provide better performance for packets whose SN is not set. However, once the packet has been sent after being assigned the SN, a transmission failure can still cause HOL blocking for another transmitted packet.

Referring back to FIG. 1, in some demonstrative aspects, devices 102 and/or 140 may be configured to support out-of-order delivery of wireless communication frames, for example, from a first MAC layer to a second MAC layer, e.g., as described below.

In some demonstrative aspects, a MAC Service Access Point (SAP) of a STA, e.g., a MAC SAP of a STA of device 102 and/or a MAC SAP of a STA of device 140, may be configured to optionally and/or selectively deliver frames out-of-order to an upper MAC layer, e.g., as described below.

In some demonstrative aspects, devices 102 and/or 140 may be configured according to a selective out-of-order delivery scheme, which may allow a STA e.g., a STA of device 102 and/or a STA of device 140, to optionally and/or selectively perform out-of-order delivery of packets to a MAC layer, e.g., as described below.

In some demonstrative aspects, implementation of a selective out-of-order delivery scheme, which may allow selective and/or optional out-of-order delivery, may provide a technical solution to support lower latency and/or higher throughput for one or more types of applications.

In some demonstrative aspects, a recipient STA or MLD of a data session, e.g., for a particular (source, TID) tuple, may optionally and/or selectively deliver received frame(s) with higher SN, for example, even if there are frames with lower SN in the scoreboard that have not been received yet, e.g., as described below.

In some demonstrative aspects, a STA or an MLD implemented by device 140, e.g., MLD 151 or any other STA implemented by device 140, may be configured to optionally and/or selectively deliver from a first MAC-layer process to a second MAC-layer process of device 140 out-of-order received frame(s), for example, frames received out-of-order from device 102, e.g., as described below.

In some demonstrative aspects, a STA or an MLD implemented by device 102, e.g., MLD 131 or any other STA implemented by device 102, may be configured to optionally and/or selectively deliver from a first MAC process to a second MAC process of device 102 out-of-order received frame(s), for example, frames received out-of-order from device 140, e.g., as described below.

Figure 5:
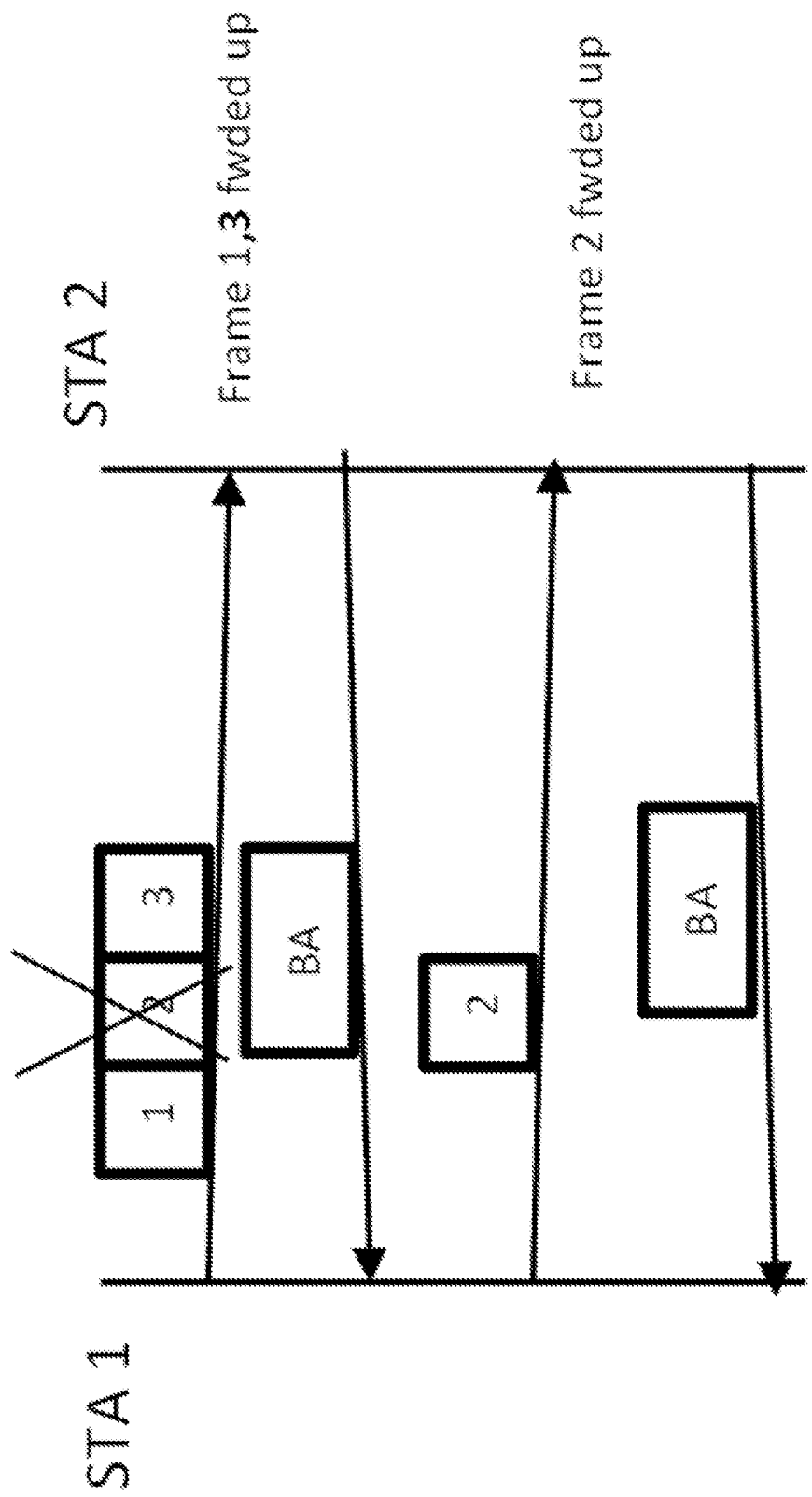
FIG. 5 is a schematic illustration of elements of communications according to an out-of-order delivery scheme, in accordance with some demonstrative aspects.

Reference is made to FIG. 5, which schematically illustrates communications according to an out-of-order delivery scheme, in accordance with some demonstrative aspects.

As shown in FIG. 5, a first STA, denoted STA 1, may transmit to a second STA, denoted STA 2, a stream of frames, e.g., including three frames, denoted frame 1, frame 2, and frame 3. For example, MLD 131 (FIG. 1) and/or any other STA of device 102 (FIG. 1) may perform one or more operations of, and/or functionalities of, the STA 1; and/or MLD 151 (FIG. 1) and/or any other STA of device 140 (FIG. 1) may perform one or more operations of, and/or functionalities of, the STA 2.

As shown in FIG. 5, the frame 1 and the frame 3 may be successfully received by the STA 2, while the frame 2 may not be received.

As shown in FIG. 5, the STA 2 may be configured to process received frames according to an out-of-order delivery scheme. For example, the STA 2 may select to deliver one or more of the frames received from the STA 1, for example, according to the order at which the frames are received, e.g., even if the SNs of the received frames are out-of-order.

For example, as shown in FIG. 5, the STA 2 may select to deliver both the received frame 1 and the received frame 3 to an upper processing layer, e.g., an upper MAC-layer process, for example, although the frame 2 has not yet been received correctly.

As shown in FIG. 5, the STA 2 may be allowed to select to deliver the frame 3 to the upper processing layer, for example, without needing to wait until the frame 2 is successfully received from the STA 1.

For example, as shown in FIG. 5, the STA 2 may transmit to the STA 1 a Block Acknowledgement (BA) indicating the successful receipt of the frame 1 and frame 3. For example, the STA 2 may successfully receive a retransmission of the frame 2 from the STA 1, and the STA 2 may then forward the frame 2 to the upper processing layer, e.g., after the frame 3 has already been delivered to the upper processing layer.

Referring back to FIG. 1, in some demonstrative aspects, controller 154 may be configured to cause a STA implemented by device 140, e.g., MLD 151 and/or any other STA of device 140, to selectively deliver frames from a first MAC-layer process of the device 140 to a second MAC-layer process of the device 140, for example, according to an out-of-order delivery scheme, e.g., as described below.

In some demonstrative aspects, the frames may be part of a stream of frames received from another STA, e.g., from MLD 131 and/or another STA of device 102.

In some demonstrative aspects, controller 154 may be configured to cause the STA implemented by device 140 to determine whether a stream of frames, e.g., a stream of frames from device 102, is suitable for out-of-order delivery from a first Media Access Control layer (MAC-layer) process to a second MAC-layer process, e.g., as described below.

In some demonstrative aspects, the second MAC-layer process may be above the first MAC-layer process. For example, the second MAC-layer process may be in a higher layer, which is higher than a layer of the first MAC-layer process.

In some demonstrative aspects, controller 154 may be configured to cause the STA implemented by device 140 to selectively deliver to the second MAC-layer process one or more frames of the stream of frames according to an out-of-order delivery scheme, e.g., as described below.

In some demonstrative aspects, controller 154 may be configured to cause the STA implemented by device 140 to select whether or not to deliver to the second MAC-layer process one or more frames of the stream of frames according to an out-of-order delivery scheme, e.g., as described below.

In some demonstrative aspects, controller 154 may be configured to cause the STA implemented by device 140 to select to deliver to the second MAC-layer process one or more frames of the stream of frames according to an out-of-order delivery scheme, for example, based on a determination that the stream of frames is suitable for out-of-order delivery, e.g., as described below.

In some demonstrative aspects, controller 154 may be configured to cause the STA implemented by device 140 to select not to deliver to the second MAC-layer process one or more frames of the stream of frames according to an out-of-order delivery scheme, for example, based on a determination that the stream of frames is not suitable for out-of-order delivery, e.g., as described below.

In some demonstrative aspects, the out-of-order delivery scheme may include delivering a first frame of the stream of frames from the first MAC-layer process to the second MAC-layer process, for example, even prior to receipt of a second frame of the stream of frames at the first MAC-layer process. For example, a Serial Number (SN) of the first frame may be after a SN of the second frame, e.g., in a monotonic sequence of SNs. In one example, the out-of-order delivery scheme may include delivering a frame with the SN 3 (e.g., the frame 3 in FIG. 5) from the first MAC-layer process to the second MAC-layer process, for example, prior to receipt of a frame with the SN 2 (e.g., the frame 2 in FIG. 5) of the stream of frames at the first MAC-layer process, e.g., as described above with respect to FIG. 5.

In some demonstrative aspects, the out-of-order delivery scheme may include delivering a frame of the stream of frames from the first MAC-layer process to the second MAC-layer process, for example, even when, or regardless of whether, not all frames of the stream of frames having a SN less than a SN of the frame have been received at the first MAC-layer process. In one example, the out-of-order delivery scheme may include delivering a frame with the SN 3 (e.g., the frame 3 in FIG. 5) from the first MAC-layer process to the second MAC-layer process, for example, even when not all frames of the stream of frames having a SN less than a SN of the frame, e.g., including the frame with the SN 2 (e.g., the frame 2 in FIG. 5), have been received at the first MAC-layer process, e.g., as described above with respect to FIG. 5.

In some demonstrative aspects, controller 154 may be configured to cause the STA implemented by device 140 to selectively handle frames of one or more first streams according to the out-of-order delivery scheme, and to handle frames of one or more second streams according to an in-order delivery scheme, e.g., as described below.

In some demonstrative aspects, controller 154 may be configured to cause the STA implemented by device 140 to determine that an other stream of frames is not suitable for out-of-order delivery, and to deliver to the second MAC-layer process one or more frames of the other stream of frames according to an in-order delivery scheme, e.g., as described below.

In some demonstrative aspects, the in-order delivery scheme may include buffering a frame of the stream of frames for delivery from the first MAC-layer process to the second MAC-layer process, and delivery of the buffered frame from the first MAC-layer process to the second MAC-layer process, for example, only upon receipt of all frames of the other stream of frames having a SN less than a SN of the frame. For example, the in-order delivery scheme may be implemented according to the in-order delivery scheme described above with reference to FIG. 4.

In some demonstrative aspects, controller 154 may be configured to cause the STA implemented by device 140 to selectively deliver a frame from the first MAC-layer process to the second MAC-layer process based on a SN of the frame, a SN threshold, and a lowest SN corresponding to a frame of the stream of frames, which has not yet been received at the first MAC-layer process, e.g., as described below.

In some demonstrative aspects, controller 154 may be configured to cause the STA implemented by device 140 to deliver the frame from the first MAC-layer process to the second MAC-layer process, for example, based on a determination that a SN difference is not greater than the SN threshold, e.g., as described below.

In some demonstrative aspects, the SN difference may be based on a difference between the SN of the frame and the lowest SN, e.g., as described below.

In other aspects, controller 154 may be configured to cause the STA implemented by device 140 to deliver the frame from the first MAC-layer process to the second MAC-layer process based on any other additional criteria relating to the SN of the frame.

In some demonstrative aspects, controller 154 may be configured to cause the STA implemented by device 140 to determine that the stream of frames is suitable for out-of-order delivery, for example, based on an out-of-order indication from a sender STA from which the stream of frames is received, for example, from the STA implemented by device 102 e.g., as described below.

In some demonstrative aspects, the out-of-order indication may include a predefined out-of-order signaling bit in a MAC header of a frame of the stream of frames, e.g., as described below.

In some demonstrative aspects, the out-of-order indication may include an indication of a Traffic Identifier (TID) to be applied to frames suitable for out-of-order delivery, e.g., as described below.

For example, the STA implemented by device 102 may be configured to send to the STA implemented by device 140 a message including an indication of a TID (out-of-order TID) to be applied to frames suitable for out-of-order delivery. For example, the STA implemented by device 102 may be configured to include the out-of-order TID in frames which are transmitted to the STA implemented by device 140, and which are suitable for out-of-order delivery. For example, STA implemented by device 140 may be configured to identified that the frames are suitable for out-of-order delivery, e.g., based on detection of the out-of-order TID.

In some demonstrative aspects, the out-of-order indication may include an indication of one or more upper layer parameters of one or more traffic streams, which do not require in-order delivery, e.g., as described below.

In other aspects, the out-of-order indication may include any other type of indication.

In some demonstrative aspects, controller 154 may be configured to cause the STA implemented by device 140 to determine that the stream of frames is suitable for out-of-order delivery, for example, based on a flow Identifier (ID) in a frame of the stream of frames, e.g., as described below.

In some demonstrative aspects, controller 154 may be configured to cause the STA implemented by device 140 to determine that the stream of frames is suitable for out-of-order delivery, for example, based on information in a control or management frame aggregated with a frame of the stream of frames, e.g., as described below.

In some demonstrative aspects, controller 154 may be configured to cause the STA implemented by device 140 to determine that the stream of frames is suitable for out-of-order delivery, for example, based on upper layer information from an upper layer process, which is above the first MAC layer process, e.g., as described below.

In some demonstrative aspects, the upper layer process may include an application layer process, e.g., as described below.

In some demonstrative aspects, the upper layer information may include stream information to identify the steam of frames, e.g., as described below.

In other aspects, the upper layer process may include any other process, and/or the upper layer information may include any other additional or alternative information.

In some demonstrative aspects, controller 154 may be configured to cause the STA implemented by device 140 to determine that the stream of frames is suitable for out-of-order delivery, for example, based on a determination that the stream of frames belongs to a traffic stream having one or more time-based limitations for delivery, e.g., as described below.

In some demonstrative aspects, controller 154 may be configured to cause the STA implemented by device 140 to determine that the stream of frames is suitable for out-of-order delivery, for example, based on one or more requirements of an upper layer process, which is above the first MAC layer process, e.g., as described below.

In some demonstrative aspects, controller 154 may be configured to cause the STA implemented by device 140 to determine that the stream of frames is suitable for out-of-order delivery, for example, based on one or more of the criteria and/or mechanisms described below.

In some demonstrative aspects, a recipient STA or MLD, e.g., a STA or MLD implemented by device 140, may be configured to maintain a threshold of a difference compared to a first "hole" in a scoreboard, for example, before determining whether to forward a frame to a higher layer.

For example, a STA that has not received a frame with a SN x may forward frames having a SN up to SN (x+thresh) modulo 4096, e.g., wherein thresh denotes the threshold.

In some demonstrative aspects, a recipient STA or MLD, e.g., a STA or MLD implemented by device 140, may be configured to forward frames up to a next MAC process, for example, if the STA has determined, e.g., from deep packet inspection, that the frame belongs to a transport/application flow which does not require in-order delivery.

In some demonstrative aspects, a recipient STA or MLD, e.g., a STA or MLD implemented by device 140, may be configured to forward frames up to a next MAC process, for example, if the STA has determined, e.g., from some signaling from the sender STA, e.g., device 102, that it belongs to a transport/application flow which does not require in-order delivery.

In some demonstrative aspects, controller 124 may be configured to cause a sender STA, e.g., a STA or MLD implemented by device 102, to send signaling information to indicate that a frame does not require in-order delivery and/or that the frame may be processed according to the out-of-order delivery scheme, e.g., as described below.

In some demonstrative aspects, the sender STA e.g., a STA or MLD implemented by device 102, may set a bit in a header, e.g., a MAC header, of a frame to signal that the corresponding frame does not require in-order delivery. In one example, the sender STA may set this bit, for example, by classifying the MAC Service Data Unit (MSDU) itself, e.g., using deep packet inspection or matching TCLAS classifiers.

In some demonstrative aspects, the sender STA e.g., a STA or MLD implemented by device 102, may signal one or more upper layer parameters, e.g., IP address, Port #, or the like, for traffic streams that do not require in-order delivery. For example, the recipient STA, e.g., the STA or MLD implemented by device 140, may be configured to match the received frames and determine whether to forward the frames up or not.

In some demonstrative aspects, the sender STA e.g., a STA or MLD implemented by device 102, may maintain out-of-order-indicative information per traffic stream that may be mapped to a TID. For example, the sender STA may embed this out-of-order-indicative information in the frame, for example, in a MAC header, e.g., in an A-Ctrl field or any other field, for a transmitted frame. For example, the recipient STA, e.g., the STA or MLD implemented by device 140, may be configured to identify the out-of-order-indicative information to determine whether the frame can be forwarded up, e.g., out-of-order.

In some demonstrative aspects, the sender STA e.g., a STA or MLD implemented by device 102, may maintain a record of all byte-streams for a particular flow, and may include an index of the first byte in the frame in the overall traffic stream.

In some demonstrative aspects, the sender STA e.g., a STA or MLD implemented by device 102, may signal the flow ID, e.g., the SCSID, to the recipient STA.

In some demonstrative aspects, the sender STA e.g., a STA or MLD implemented by device 102, may signal a flow identifier (flowID) and/or a relative index of the frame in an Aggregated MAC Protocol Data Unit (A-MPDU).

In one example, in case where a sender STA is transmitting an A-MPDU of 10 Data frames with SN: 1-10 that belong to a same TID. For example, the frames with SN #1-5 may belong to a first flow (flow 1), and the frames with SN #6-10 may belong to a second flow (flow 2). In this case, the sender station may configure the frames #1-5 to carry the information (flow Id=1, relative index=1, . . . 5), and the frames #6-10 to carry the information (flow Id=2, relative index=1, . . . 5) respectively.

In some demonstrative aspects, the sender STA, e.g., the STA of device 102, may be configured to send to the recipient STA, e.g., the STA of device 140, a control (Ctrl) frame or a management (Mgt) frame, which may be aggregated with an A-MPDU. For example, the control/management frame may be configured by the sender STA to carry information that can help the receiver STA to identify for a packet with a given SN, which flow it belongs to and the relative index. For example, the recipient STA may be configured to select not to perform out-of-order delivery, for example, in case the control/management frame is not correctly received at the recipient STA.

In some demonstrative aspects, for example, when implementing a QUIC protocol, an upper layer may provide information that allows the MAC layer to identify the stream to which a particular MSDU received from the MAC SAP belongs to. For example, this information from the upper layer may be in the form of a stream index, stream offset information, and/or any other index and/or information.

In some demonstrative aspects, the sender STA, e.g., the STA implemented by device 102, and the receiver STA, e.g., the STA implemented by device 140, may be configured to perform a capability exchange between the sender and receiver STA, for example, a-priori and/or during a negotiation phase to negotiate a traffic stream setup. For example, the sender STA, e.g., the STA implemented by device 102, and the receiver STA, e.g., the STA implemented by device 140, may be configured to utilize the capability exchange to determine whether or not out-of-order delivery should be enabled at the receiver with respect to one or more traffic streams.

In some demonstrative aspects, a sender STA (also referred to as "transmitting STA") e.g., a STA or MLD implemented by device 102, may be configured to classify incoming packets of a stream as in-order or as out-of-order. In one example, the sender STA may classify the packets, for example, with deep packet inspection, based on explicit signaling from an upper layer, and/or based on any other mechanism, In some demonstrative aspects, the sender STA e.g., a STA or MLD implemented by device 102, may be configured to reserve a particular TID for packets of an out-of-order stream. The sender STA may be configured to deliver to the receiver STA TID information to identify the particular TID to be used for the out-of-order stream. In one example, the sender STA may deliver the TID information to the recipient STA, for example, using a negotiation procedure, e.g. as part of a BlockAck setup agreement, a traffic stream setup, and/or any other management frame exchange. The recipient STA may be configured to identify and treat packets with the particular TID as packets that do not require in-order delivery, and may be delivered out-of-order.

In some demonstrative aspects, the recipient STA e.g., a STA or MLD implemented by device 140, may be allowed to forward frames to the upper layer out of order, for example, if the frames are classified/identified to be part of a traffic stream that requires low latency service, as a time-sensitive networking (TSN) stream, as a stream that has an associated delivery deadline, and/or any other stream which may be identified as not requiring in-order delivery.

In some demonstrative aspects, the Sequence Number (SN) field in a frame may be reserved, or may contain an index of the MPDU in that A-MPDU, for example, when out-of-order delivery is allowed at the recipient STA.

In some demonstrative aspects, a recipient STA or MLD, e.g., a STA or MLD implemented by device 140, may be configured to conservatively deliver frames out-of-order. For example, controller 154 may be configured to allow the STA implemented by device 140 to deliver frames out-of-order, for example, only if the STA determines that doing so would not hurt application/transport layer performance.

In one example, the recipient STA e.g., a STA or MLD implemented by device 140, may determine that a number of missing frames in an A-MPDU is small, and these missing frames may be transmitted by the sender STA, for example, before the recipient STA has a chance to send transport/application layer acknowledgements, e.g., TCP Acks.

In some demonstrative aspects, controller 154 may be configured to cause the STA implemented by device 140 to detect whether a received frame is a replay frame, e.g., as described below.

In some demonstrative aspects, controller 154 may be configured to cause the STA implemented by device 140 to maintain a scoreboard of received Packet Numbers (PNs) according to a scoreboard window, and to detect that a received frame is a replay frame, for example, based on a comparison between a PN of the received frame and the received PNs in the scoreboard, e.g., as described below.

In some demonstrative aspects, a STA which is allowed to perform out-of-order delivery by the MAC to the upper layer may utilize a suitable replay frame detection mechanism, e.g., as described below.

In some demonstrative aspects, the sender STA e.g., a STA or MLD implemented by device 102, may be configured to agree to increment a PN number by a deterministic number, e.g., 1 or any other value, for example, for every frame with a higher SN that belongs to the same TID flow.

In some demonstrative aspects, the sender STA e.g., a STA or MLD implemented by device 102, and the recipient STA e.g., a STA or MLD implemented by device 140, may be configured to maintain a separate PN counter, for example, for each flow, which may be identified, for example, from an SCSID that may map to a same TID.

In some demonstrative aspects, the recipient STA e.g., a STA or MLD implemented by device 140, may be configured to maintain a scoreboard of PNs received so far.

In some demonstrative aspects, an end of a window for the scoreboard may be moved forward, for example, whenever the PN of the received frame is higher than the start of the window+(length of the scoreboard*the granularity of PN increments). In other aspects, any other mechanism may be implemented to adjust the window for the scoreboard.

In some demonstrative aspects, controller 154 may be configured to cause the recipient STA implemented by device 140 to detect a replay frame, for example, if a received frame is below the scoreboard, or if the received frame is within the scoreboard but has been received before. Otherwise, for example, controller 154 may be configured to cause the recipient STA implemented by device 140 to mark the frame as being received, update the PN scoreboard and forward the frame up to the upper MAC processing layer.

In some demonstrative aspects, out-of-order delivery may be implemented with respect to non-collocated MLDs, e.g., as described below.

In some demonstrative aspects, a non-collocated MLD may make use of the out-of-order delivery feature, for example, for Downlink (DL) and/or Uplink (UL) frames, for example, in order to implement a technical solution to minimize an amount of coordination required across two different physical devices of the non-collocated MLD.

In some demonstrative aspects, an upper MAC entity/controller at the MLD, e.g., controller 124 of MLD 131 and/or controller 154 of MLD 151, may provide to the non-collocated STAs affiliated to it information to define a start Sequence number, a BA window length, and/or a set of SN each STA is allowed to use. For example, the sets of SNs that each SAT of the non-collocated MLD may use may be defined to be non-overlapping.

In some demonstrative aspects, a STA of the non-collocated MLD, e.g., each non-collocated STA, may perform its own SN assignment, and AMSDU aggregation to the data in its buffer, for example, as long as they are within the allowed SN space.

In some demonstrative aspects, the controller of the MLD may be configured to update the scoreboard and/or the allowed SN space, for example, once new data is ready to be delivered and/or based on the last BA received.

Figure 6:
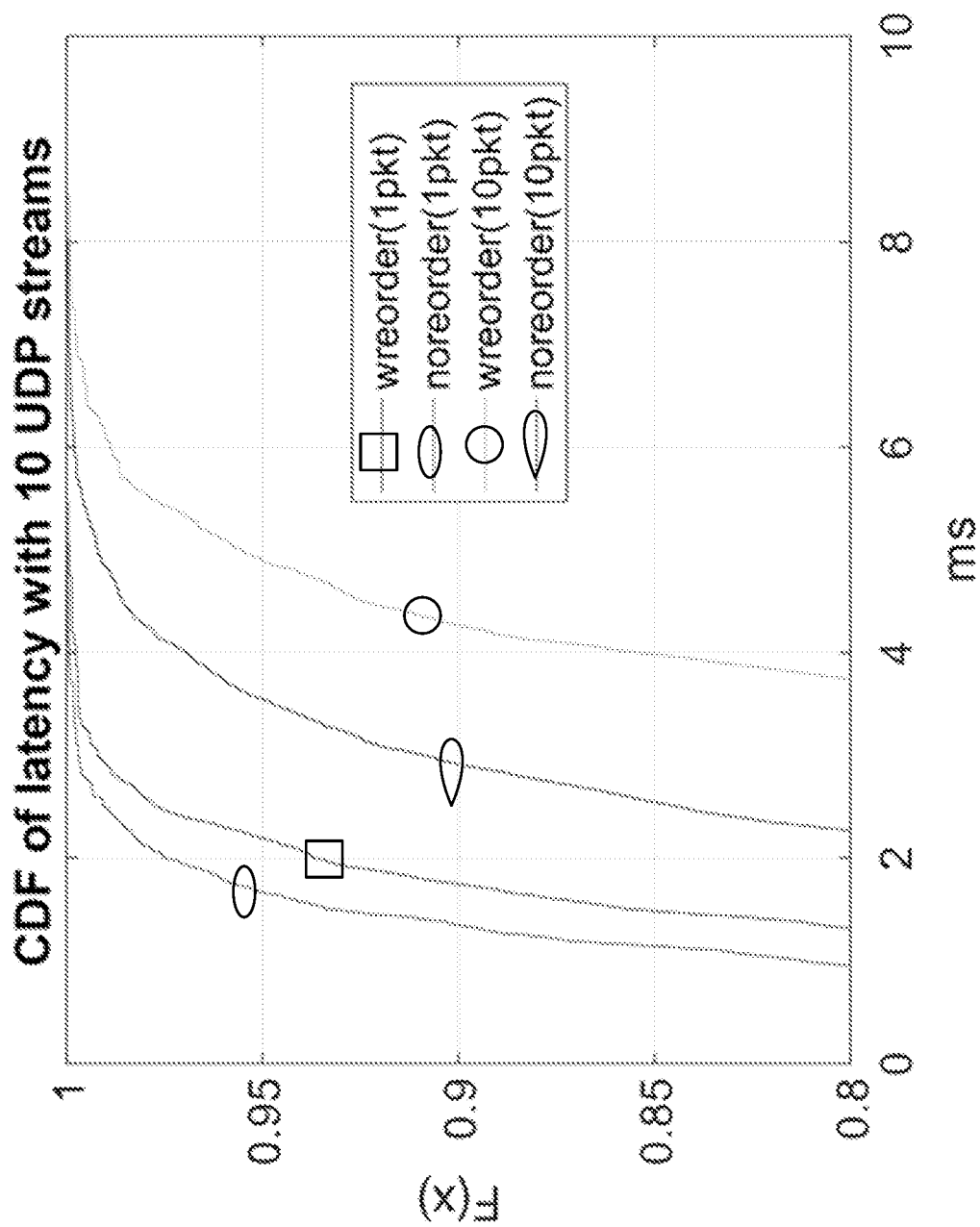
FIG. 6 is an illustration of a graph depicting a Cumulative Distribution Function (CDF) of latency with respect to packets processed according to an in-order delivery scheme and with respect to packets processed according to an out-of-order delivery scheme, in accordance with some demonstrative aspects.

FIG. 6 is an illustration of a graph depicting a Cumulative distribution function (CDF) of latency with respect to packets processed according to an in-order delivery scheme and with respect to packets processed according to an out-of-order delivery scheme, in accordance with some demonstrative aspects.

For example, the graph of FIG. 6 depicts the CDF of the latency with 10 User Datagram Protocol (UDP) streams.

For example, the graph of FIG. 6 provides a comparison of the CDF of latency with 10 DL UDP streams aggregated to a same TID generating N packets, e.g., where N=1 or N=10, each of size 1400 bytes, every 20 milliseconds (ms).

For example, the graph of FIG. 6 simulates a scenario where there are four other interfering STAs that together occupy 10% of airtime and each generate frames every 279 us.

For example, as shown in FIG. 6, for the case of N=10, the 90%-ile latency out-of-order delivery is 2.9 ms, compared to the 90%-ile latency of 4.27 ms for in-order delivery, e.g., showing an improvement of ~30%.

For example, as shown in FIG. 6, for the case of N=1, the 90%-ile latency out-of-order delivery is 1.35 ms, compared to the 90%-ile latency of 1.75 ms for in-order delivery, e.g., showing an improvement of ~22%.

Figure 7:
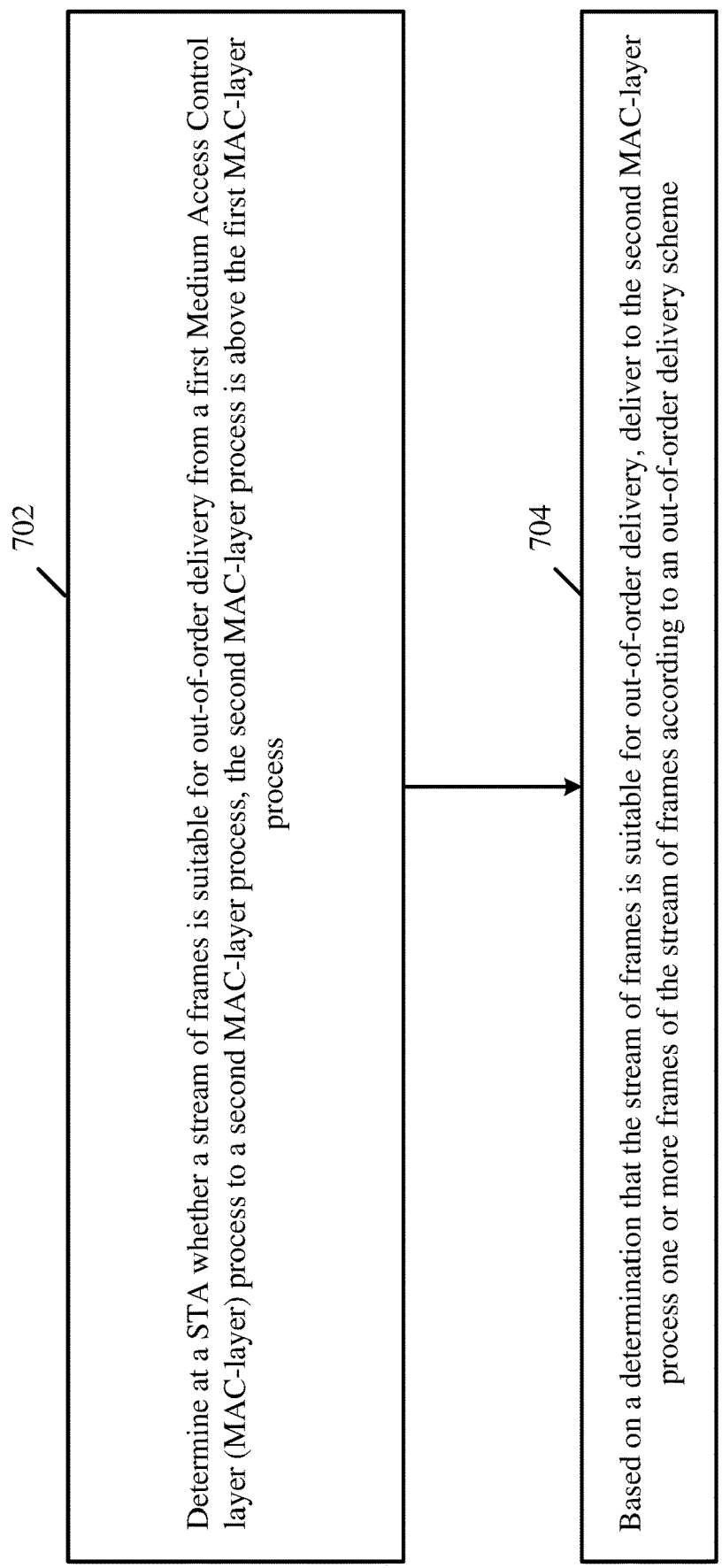
FIG. 7 is a schematic flow-chart illustration of a method of out-of-order delivery of wireless communication frames, in accordance with some demonstrative aspects.

Reference is made to FIG. 7, which schematically illustrates a method of out-of-order delivery of wireless communication frames, in accordance with some demonstrative aspects. For example, one or more of the operations of the method of FIG. 7 may be performed by one or more elements of a system, e.g., system 100 (FIG. 1), for example, one or more wireless devices, e.g., device 102 (FIG. 1), and/or device 140 (FIG. 1), an MLD, e.g., MLD 131 (FIG. 1) and/or MLD 151 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 702, the method may include determining, at a STA, whether a stream of frames is suitable for out-of-order delivery from a first Medium Access Control layer (MAC-layer) process to a second MAC-layer process, the second MAC-layer process is above the first MAC-layer process. For example, controller 154 (FIG. 1) may be configured to cause, trigger, and/or control STA 155 (FIG. 1) and/or MLD 151 (FIG. 1) to determine whether a stream of frames is suitable for out-of-order delivery from a first MAC-layer process to a second MAC-layer process, e.g., as described above.

As indicated at block 704, the method may include delivering to the second MAC-layer process one or more frames of the stream of frames according to an out-of-order delivery scheme, for example, based on a determination that the stream of frames is suitable for out-of-order delivery. For example, controller 154 (FIG. 1) may be configured to cause, trigger, and/or control STA 155 (FIG. 1) and/or MLD 151 (FIG. 1) to selectively deliver to the second MAC-layer process one or more frames of the stream of frames according to an out-of-order delivery scheme, for example, based on a determination that the stream of frames is suitable for out-of-order delivery, e.g., as described above.

Figure 8:
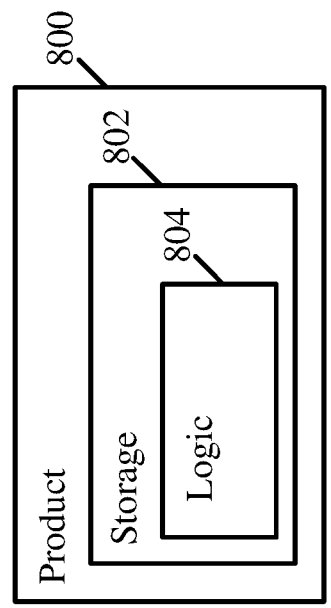
FIG. 8 is a schematic illustration of a product of manufacture, in accordance with some demonstrative aspects.

Reference is made to FIG. 8, which schematically illustrates a product of manufacture 800, in accordance with some demonstrative aspects. Product 800 may include one or more tangible computer-readable ("machine-readable") non-transitory storage media 802, which may include computer-executable instructions, e.g., implemented by logic 804, operable to, when executed by at least one computer processor, enable the at least one computer processor to implement one or more operations at device 102 (FIG. 1), device 140 (FIG. 1), MLD 131 (FIG. 1), MLD 151 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), message processor 128 (FIG. 1), message processor 158 (FIG. 1), controller 124 (FIG. 1), and/or controller 154 (FIG. 1), to cause device 102 (FIG. 1), device 140 (FIG. 1), MLD 131 (FIG. 1), MLD 151 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), message processor 128 (FIG. 1), message processor 158 (FIG. 1), controller 124 (FIG. 1), and/or controller 154 (FIG. 1), to perform, trigger and/or implement one or more operations and/or functionalities, and/or to perform, trigger and/or implement one or more operations and/or functionalities described with reference to the FIGS. 1, 2, 3, 4, 5, 6, and/or 7, and/or one or more operations described herein. The phrases "non-transitory machine-readable medium" and "computer-readable non-transitory storage media" may be directed to include all machine and/or computer readable media, with the sole exception being a transitory propagating signal.

In some demonstrative aspects, product 800 and/or machine readable storage media 802 may include one or more types of computer-readable storage media capable of storing data, including volatile memory, non-volatile memory, removable or non-removable memory, erasable or non-erasable memory, writeable or re-writeable memory, and the like. For example, machine readable storage media 802 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 804 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 804 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further aspects.

Example 1 includes an apparatus comprising logic and circuitry configured to cause a wireless communication station (STA) to determine whether a stream of frames is suitable for out-of-order delivery from a first Medium Access Control layer (MAC-layer) process to a second MAC-layer process, the second MAC-layer process is above the first MAC-layer process; and based on a determination that the stream of frames is suitable for out-of-order delivery, deliver to the second MAC-layer process one or more frames of the stream of frames according to an out-of-order delivery scheme.

Example 2 includes the subject matter of Example 1, and optionally, wherein the out-of-order delivery scheme comprises delivering a first frame of the stream of frames from the first MAC-layer process to the second MAC-layer process prior to receipt of a second frame of the stream of frames at the first MAC-layer process, wherein a Serial Number (SN) of the first frame is after a SN of the second frame.

Example 3 includes the subject matter of Example 1 or 2, and optionally, wherein the out-of-order delivery scheme comprises delivering a frame of the stream of frames from the first MAC-layer process to the second MAC-layer process when not all frames of the stream of frames having a Serial Number (SN) less than a SN of the frame have been received at the first MAC-layer process.

Example 4 includes the subject matter of any one of Examples 1-3, and optionally, wherein the apparatus is configured to cause the STA to selectively deliver a frame from the first MAC-layer process to the second MAC-layer process based on a Serial Number (SN) of the frame, a SN threshold, and a lowest SN corresponding to a frame of the stream of frames, which has not yet been received at the first MAC-layer process.

Example 5 includes the subject matter of Example 4, and optionally, wherein the apparatus is configured to cause the STA to deliver the frame from the first MAC-layer process to the second MAC-layer process based on a determination that a SN difference is not greater than the SN threshold, wherein the SN difference is based on a difference between the SN of the frame and the lowest SN.

Example 6 includes the subject matter of any one of Examples 1-5, and optionally, wherein the apparatus is configured to cause the STA to determine that the stream of frames is suitable for out-of-order delivery based on an out-of-order indication from a sender STA from which the stream of frames is received.

Example 7 includes the subject matter of Example 6, and optionally, wherein the out-of-order indication comprises a predefined out-of-order signaling bit in a MAC header of a frame of the stream of frames.

Example 8 includes the subject matter of Example 6 or 7, and optionally, wherein the out-of-order indication comprises an indication of a Traffic Identifier (TID) to be applied to frames suitable for out-of-order delivery.

Example 9 includes the subject matter of any one of Examples 6-8, and optionally, wherein the out-of-order indication comprises an indication of one or more upper layer parameters of one or more traffic streams, which do not require in-order delivery.

Example 10 includes the subject matter of any one of Examples 1-9, and optionally, wherein the apparatus is configured to cause the STA to determine that the stream of frames is suitable for out-of-order delivery based on a flow Identifier (ID) in a frame of the stream of frames.

Example 11 includes the subject matter of any one of Examples 1-10, and optionally, wherein the apparatus is configured to cause the STA to determine that the stream of frames is suitable for out-of-order delivery based on information in a control or management frame aggregated with a frame of the stream of frames.

Example 12 includes the subject matter of any one of Examples 1-11, and optionally, wherein the apparatus is configured to cause the STA to determine that the stream of frames is suitable for out-of-order delivery based on upper layer information from an upper layer process, which is above the first MAC layer process.

Example 13 includes the subject matter of Example 12, and optionally, wherein the upper layer process comprises an application layer process.

Example 14 includes the subject matter of Example 12 or 13, and optionally, wherein the upper layer information comprises stream information to identify the steam of frames.

Example 15 includes the subject matter of any one of Examples 1-14, and optionally, wherein the apparatus is configured to cause the STA to determine that the stream of frames is suitable for out-of-order delivery based on a determination that the stream of frames belongs to a traffic stream having one or more time-based limitations for delivery.

Example 16 includes the subject matter of any one of Examples 1-15, and optionally, wherein the apparatus is configured to cause the STA to determine that the stream of frames is suitable for out-of-order delivery based on one or more requirements of an upper layer process, which is above the first MAC layer process.

Example 17 includes the subject matter of any one of Examples 1-16, and optionally, wherein the apparatus is configured to cause the STA to maintain a scoreboard of received Packet Numbers (PNs) according to a scoreboard window, and to detect that a received frame is a replay frame based on a comparison between a PN of the received frame and the received PNs in the scoreboard.

Example 18 includes the subject matter of any one of Examples 1-17, and optionally, wherein the apparatus is configured to cause the STA to determine that an other stream of frames is not suitable for out-of-order delivery, and to deliver to the second MAC-layer process one or more frames of the other stream of frames according to an in-order delivery scheme.

Example 19 includes the subject matter of Example 18, and optionally, wherein the in-order delivery scheme comprises buffering a frame of the stream of frames for delivery from the first MAC-layer process to the second MAC-layer process only upon receipt of all frames of the other stream of frames having a Serial Number (SN) less than a SN of the frame.

Example 20 includes the subject matter of any one of Examples 1-19, and optionally, comprising at least one radio to receive the stream of frames.

Example 21 includes the subject matter of Example 20, and optionally, comprising one or more antennas connected to the radio, and a processor to execute instructions of an operating system of the STA.

Example 22 comprises an apparatus comprising means for executing any of the described operations of Examples 1-21.

Example 23 comprises a product comprising one or more tangible computer-readable non-transitory storage media comprising computer-executable instructions operable to, when executed by at least one processor, enable the at least one processor to cause a computing device to perform any of the described operations of Examples 1-21.

Example 24 comprises an apparatus comprising: a memory interface; and processing circuitry configured to: perform any of the described operations of Examples 1-21.

Example 25 comprises a method comprising any of the described operations of Examples 1-21.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
a processor configured to cause a wireless communication station (STA) to:
determine whether a stream of frames is suitable for out-of-order delivery from a first Medium Access Control layer (MAC-layer) process to a second MAC-layer process, the second MAC-layer process is above the first MAC-layer process; and
based on a determination that the stream of frames is suitable for out-of-order delivery, deliver to the second MAC-layer process one or more frames of the stream of frames according to an out-of-order delivery scheme by selectively delivering a frame from the first MAC-layer process to the second MAC-layer process based on a Serial Number (SN) of the frame, a SN threshold, and a lowest SN corresponding to a frame of the stream of frames, which has not yet been received at the first MAC-layer process; and
a memory to store information processed by the processor.

2. The apparatus of claim 1, wherein the out-of-order delivery scheme comprises delivering a first frame of the stream of frames from the first MAC-layer process to the second MAC-layer process prior to receipt of a second frame of the stream of frames at the first MAC-layer process, wherein a SN of the first frame is after a SN of the second frame.

3. The apparatus of claim 1, wherein the out-of-order delivery scheme comprises delivering a particular frame of the stream of frames from the first MAC-layer process to the second MAC-layer process when not all frames of the stream of frames having a SN less than a SN of the particular frame have been received at the first MAC-layer process.

4. The apparatus claim 1 configured to cause the STA to deliver the frame from the first MAC-layer process to the second MAC-layer process based on a determination that a SN difference is not greater than the SN threshold, wherein the SN difference is based on a difference between the SN of the frame and the lowest SN.

5. The apparatus of claim 1 configured to cause the STA to determine that the stream of frames is suitable for out-of-order delivery based on an out-of-order indication from a sender STA from which the stream of frames is received.

6. The apparatus of claim 5, wherein the out-of-order indication comprises a predefined out-of-order signaling bit in a MAC header of a particular frame of the stream of frames.

7. The apparatus of claim 5, wherein the out-of-order indication comprises an indication of a Traffic Identifier (TID) to be applied to frames suitable for out-of-order delivery.

8. The apparatus of claim 5, wherein the out-of-order indication comprises an indication of one or more upper layer parameters of one or more traffic streams, which do not require in-order delivery.

9. The apparatus of claim 1 configured to cause the STA to determine that the stream of frames is suitable for out-of-order delivery based on a flow Identifier (ID) in a particular frame of the stream of frames.

10. The apparatus of claim 1 configured to cause the STA to determine that the stream of frames is suitable for out-of-order delivery based on information in a control or management frame aggregated with a particular frame of the stream of frames.

11. The apparatus of claim 1 configured to cause the STA to determine that the stream of frames is suitable for out-of-order delivery based on upper layer information from an upper layer process, which is above the first MAC layer process.

12. The apparatus of claim 11, wherein the upper layer process comprises an application layer process.

13. The apparatus of claim 11, wherein the upper layer information comprises stream information to identify the steam of frames.

14. The apparatus of claim 1 configured to cause the STA to determine that the stream of frames is suitable for out-of-order delivery based on a determination that the stream of frames belongs to a traffic stream having one or more time-based limitations for delivery.

15. The apparatus of claim 1 configured to cause the STA to determine that the stream of frames is suitable for out-of-order delivery based on one or more requirements of an upper layer process, which is above the first MAC layer process.

16. The apparatus of claim 1 configured to cause the STA to maintain a scoreboard of received Packet Numbers (PNs) according to a scoreboard window, and to detect that a received frame is a replay frame based on a comparison between a PN of the received frame and the received PNs in the scoreboard.

17. The apparatus of claim 1 configured to cause the STA to determine that an other stream of frames is not suitable for out-of-order delivery, and to deliver to the second MAC-layer process one or more frames of the other stream of frames according to an in-order delivery scheme.

18. The apparatus of claim 17, wherein the in-order delivery scheme comprises buffering a frame of the other stream of frames for delivery from the first MAC-layer process to the second MAC-layer process only upon receipt of all frames of the other stream of frames having a SN less than a SN of the frame of the other stream of frames.

19. The apparatus of claim 1 comprising at least one radio to receive the stream of frames.

20. The apparatus of claim 19 comprising one or more antennas connected to the radio, and another processor to execute instructions of an operating system.

21. A product comprising one or more tangible computer-readable non-transitory storage media comprising computer-executable instructions operable to, when executed by at least one processor, enable the at least one processor to cause a wireless communication station (STA) to:
    determine whether a stream of frames is suitable for out-of-order delivery from a first Medium Access Control layer (MAC-layer) process to a second MAC-layer process, the second MAC-layer process is above the first MAC-layer process; and
    based on a determination that the stream of frames is suitable for out-of-order delivery, deliver to the second MAC-layer process one or more frames of the stream of frames according to an out-of-order delivery scheme, wherein the instructions, when executed, cause the STA to selectively deliver a frame from the first MAC-layer process to the second MAC-layer process based on a Serial Number (SN) of the frame, a SN threshold, and a lowest SN corresponding to a frame of the stream of frames, which has not yet been received at the first MAC-layer process.

22. The product of claim 21, wherein the instructions, when executed, cause the STA to determine that the stream of frames is suitable for out-of-order delivery based on an out-of-order indication from a sender STA from which the stream of frames is received.

23. An apparatus comprising:
    means for determining at a wireless communication station (STA) whether a stream of frames is suitable for out-of-order delivery from a first Medium Access Control layer (MAC-layer) process to a second MAC-layer process, the second MAC-layer process is above the first MAC-layer process; and
    means for, based on a determination that the stream of frames is suitable for out-of-order delivery, delivering to the second MAC-layer process one or more frames of the stream of frames according to an out-of-order delivery scheme by selectively delivering a frame from the first MAC-layer process to the second MAC-layer process based on a Serial Number (SN) of the frame, a SN threshold, and a lowest SN corresponding to a frame of the stream of frames, which has not yet been received at the first MAC-layer process.

24. The apparatus of claim 23 comprising means for causing the STA to determine that an other stream of frames is not suitable for out-of-order delivery, and to deliver to the second MAC-layer process one or more frames of the other stream of frames according to an in-order delivery scheme.

* * * * *